(12) United States Patent
Islam

(10) Patent No.: US 9,465,183 B2
(45) Date of Patent: Oct. 11, 2016

(54) METAL ARMORED BREAK-OUT CABLE ASSEMBLY WITH GROUNDING FEATURE

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 14/726,492

(22) Filed: May 30, 2015

(65) Prior Publication Data
US 2015/0346451 A1    Dec. 3, 2015

Related U.S. Application Data

(60) Provisional application No. 62/005,804, filed on May 30, 2014.

(51) Int. Cl.
| | |
|---|---|
| G02B 6/44 | (2006.01) |
| H02G 1/00 | (2006.01) |
| H02G 15/117 | (2006.01) |
| H02G 15/105 | (2006.01) |
| H02G 15/115 | (2006.01) |

(52) U.S. Cl.
CPC ........... *G02B 6/4472* (2013.01); *G02B 6/4416* (2013.01); *H02G 1/005* (2013.01); *H02G 15/1055* (2013.01); *H02G 15/117* (2013.01); *H02G 15/115* (2013.01); *Y10T 29/49195* (2015.01)

(58) Field of Classification Search
USPC .................................................... 174/68.1, 93
See application file for complete search history.

(56) References Cited

U.S. PATENT DOCUMENTS

| | | | | |
|---|---|---|---|---|
| 4,558,174 A | * | 12/1985 | Massey | ............... G02B 6/4447 174/78 |
| 6,051,792 A | * | 4/2000 | Damm | ................ H02G 15/007 174/92 |
| 2005/0221670 A1 | | 10/2005 | Neumann et al. | |
| 2012/0252265 A1 | | 10/2012 | Wild et al. | |
| 2013/0129296 A1 | | 5/2013 | Murano et al. | |
| 2014/0134863 A1 | | 5/2014 | Van Swearingen et al. | |

FOREIGN PATENT DOCUMENTS

WO    WO 2014/048929    4/2014

* cited by examiner

*Primary Examiner* — Dhirubhai R Patel
(74) *Attorney, Agent, or Firm* — Myers Bigel & Sibley, P.A.

(57) ABSTRACT

A break-out assembly includes an enclosure including a first side with a first opening and a second side, opposite the first side, with a plurality of second openings. A conductive frame is disposed within the enclosure. The conductive frame includes a first spring basket aligned to the first opening and a plurality of second spring baskets aligned to the plurality of second openings.

15 Claims, 13 Drawing Sheets

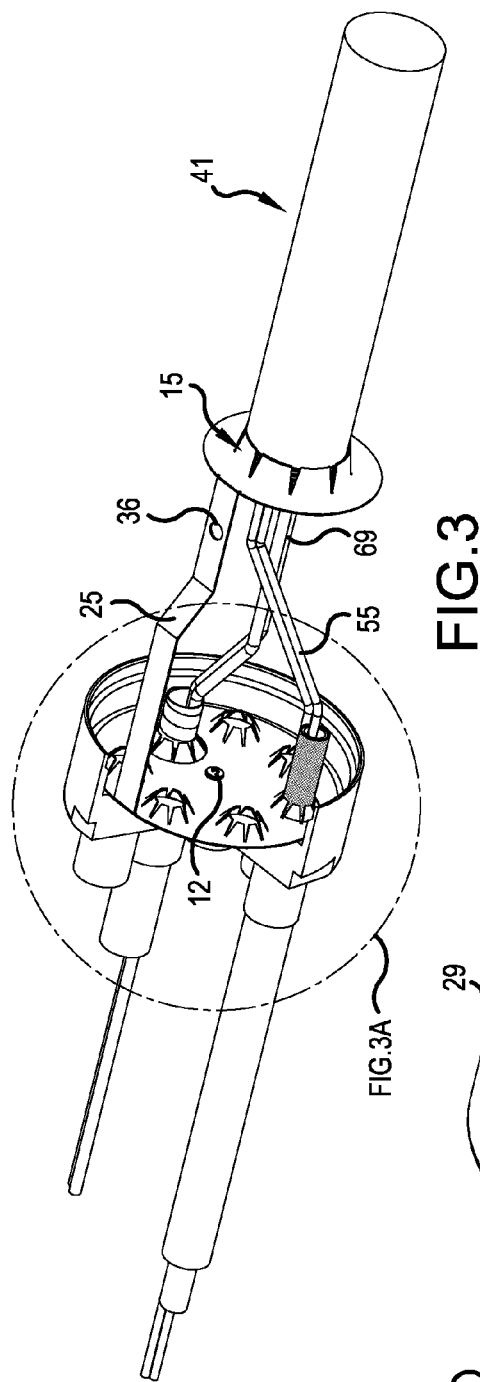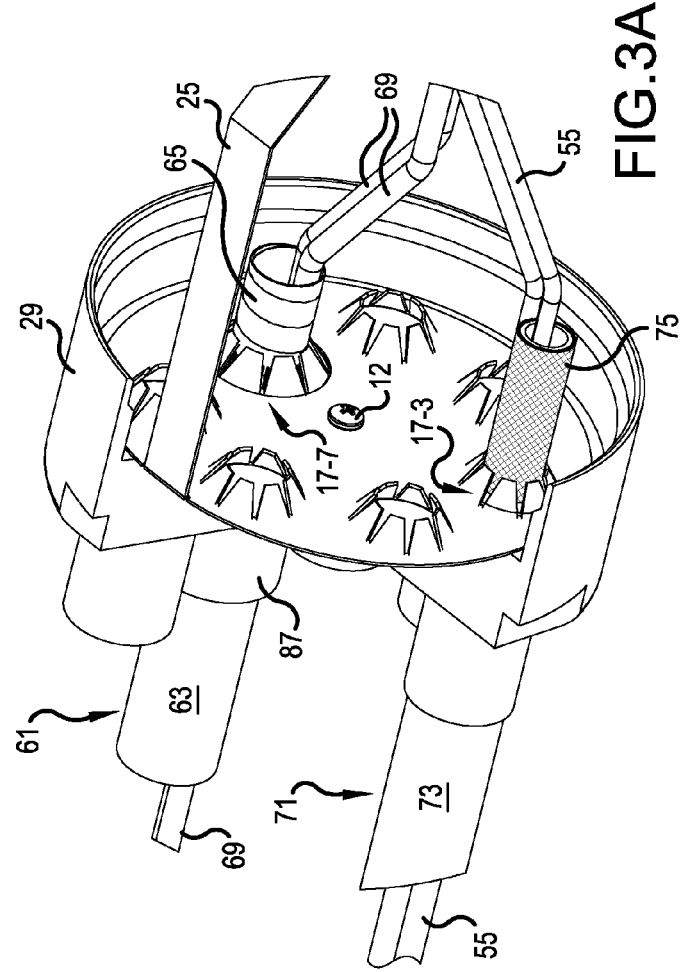

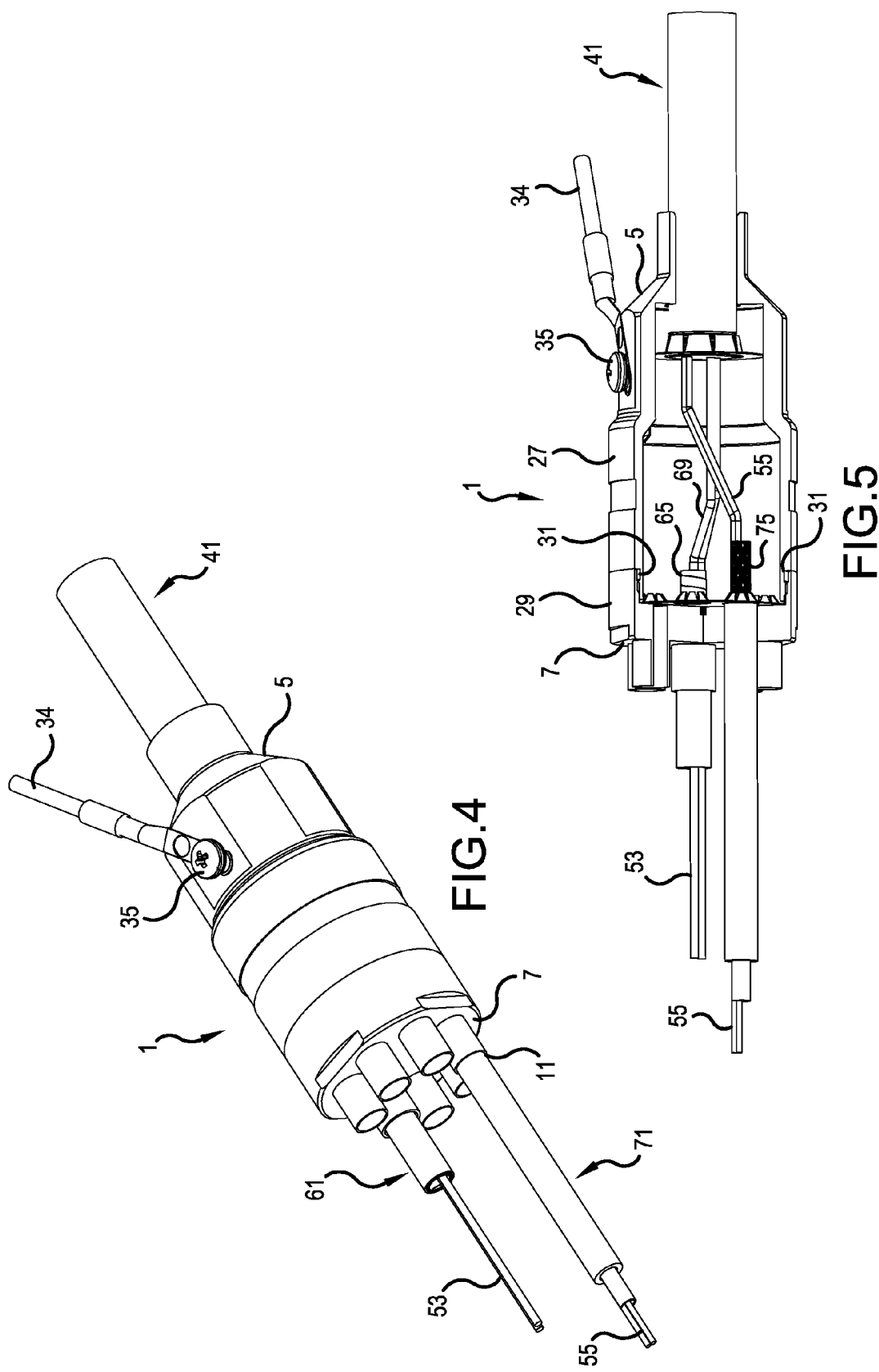

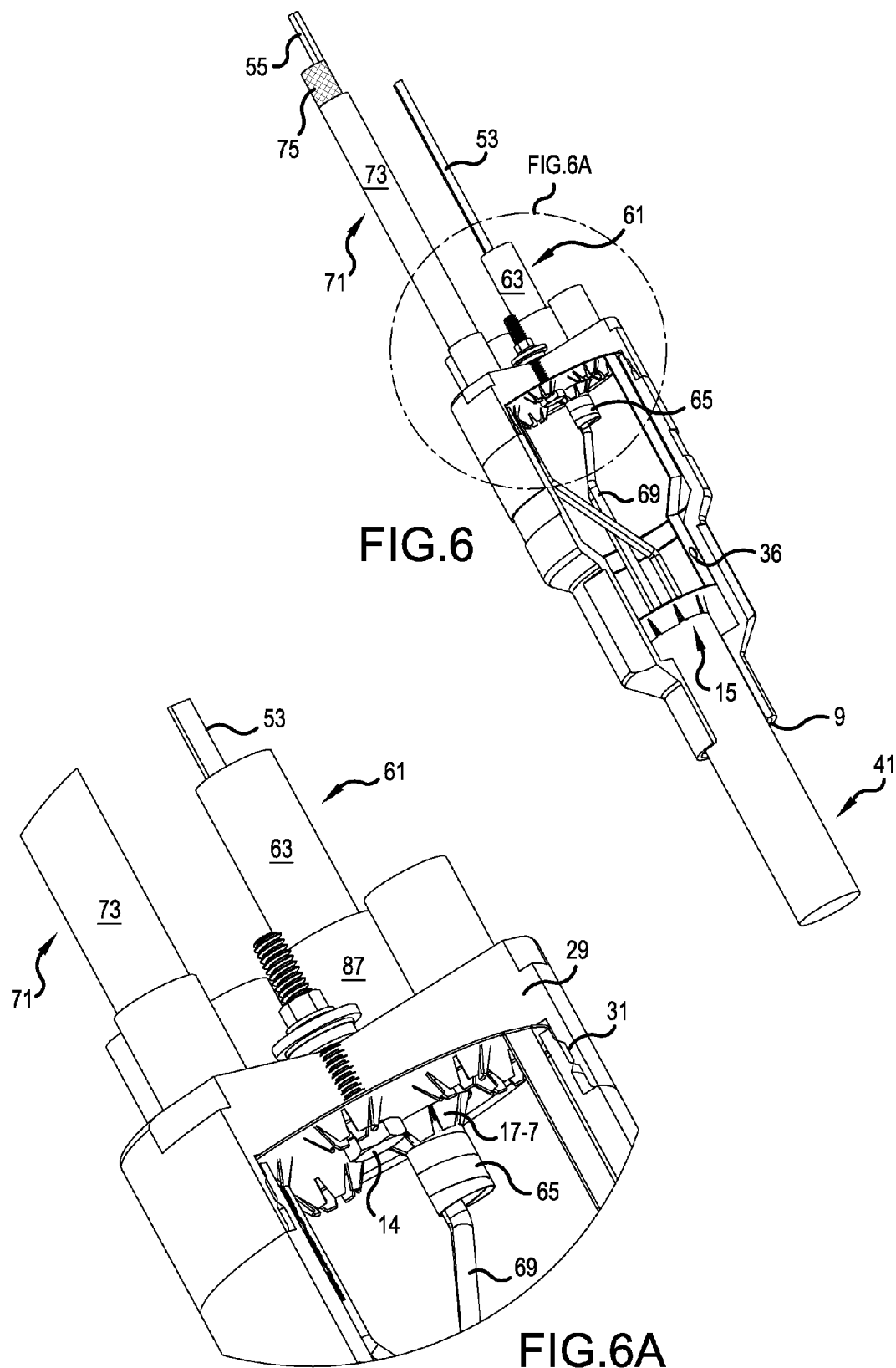

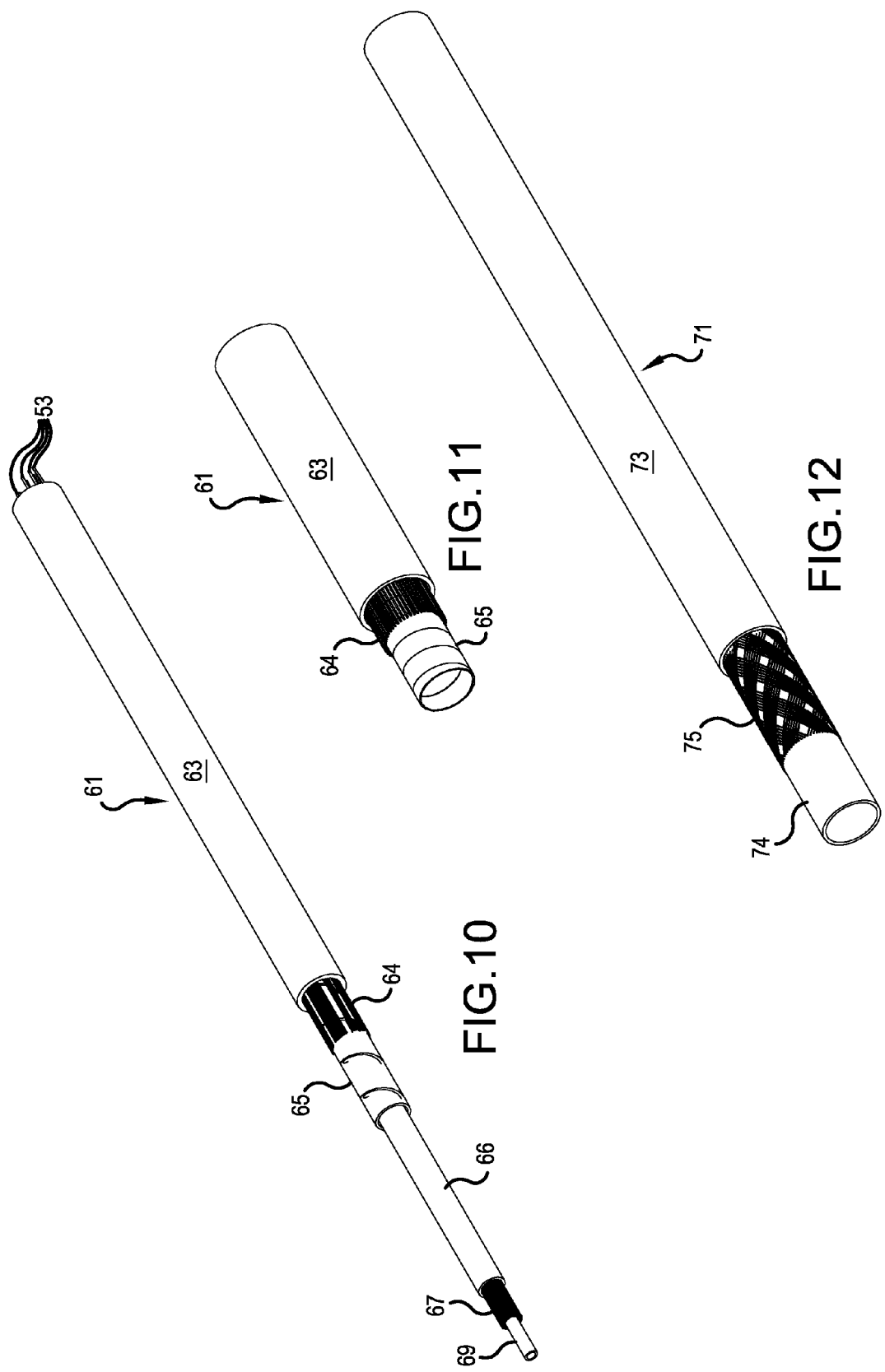

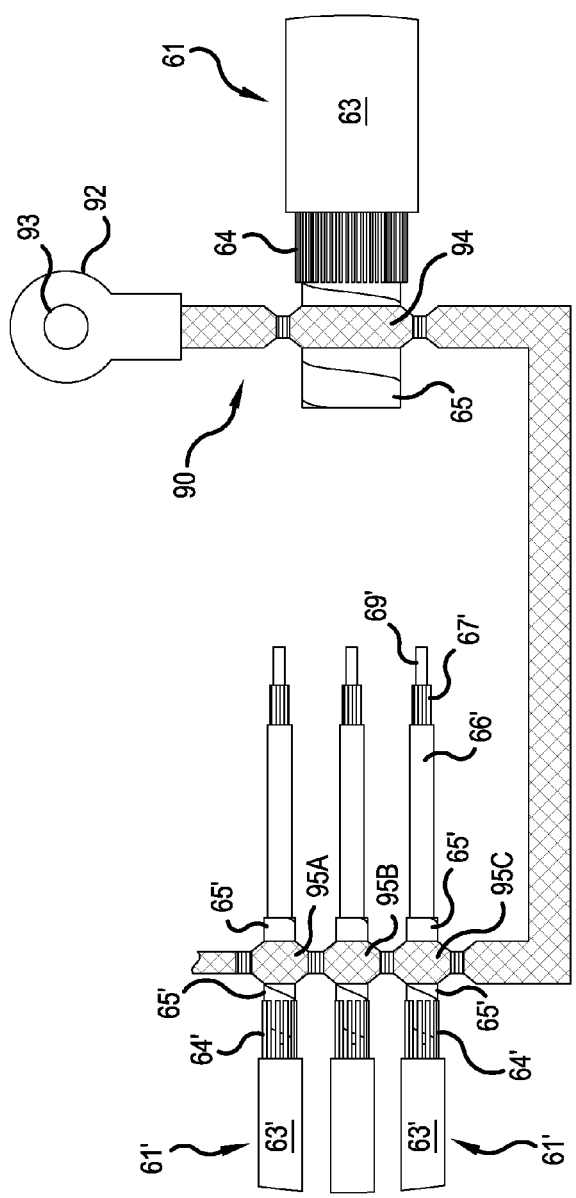
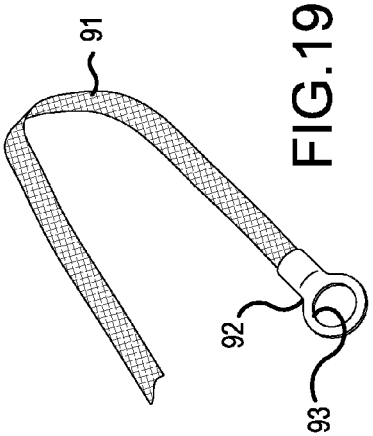

METAL ARMORED BREAK-OUT CABLE ASSEMBLY WITH GROUNDING FEATURE

This application claims the benefit of U.S. Provisional Application No. 62/005,804, filed May 30, 2014, the entire contents of which are herein incorporated by reference.

BACKGROUND OF THE INVENTION

Field of the Invention

The present invention relates to a break-out assembly for transitioning a group of optical fibers and/or conductors within a single, large cable to multiple smaller cables, each possessing fewer fibers and/or conductors than the group within the single large cable. More particularly, the present invention relates to an environmentally sealed housing which includes grounding features to electrically connect the shielding/armor layer of a trunk cable to the shielding/armor layers of the multiple smaller cables.

SUMMARY OF THE INVENTION

There is a need in the art for a cable assembly with armored breakouts to protect optical fiber (and also power conductors) from crushing and to resist rodents/birds. However, these metal breakouts must be grounded for lightning protection.

The Applicant has appreciated a need for a break-out assembly, which is simpler in design and/or less costly to manufacture. The Applicant has also appreciated a need for a break-out assembly which is more robust and/or contains fewer parts to simplify installation and/or contains features enabling improved environmental sealing characteristics and grounding.

These and other objects are accomplished by a device having a larger canister which breaks out power conductors from fibers held in a trunk cable. Fiber is broken out by the smaller, secondary canister. Power sleeves exiting the larger canister are braided or armored. An armored large furcation tube connects the larger canister to the smaller canister and passes the fiber subunits from the large canister to the small canister.

The larger canister has several ports for power sleeves and at least one port (perhaps larger) for an armored large furcation tube. The larger port takes multiple (e.g., three) fiber subunits from the hybrid cable, e.g., the trunk cable. Power conductors (e.g., two) from the trunk cable are inserted into each power sleeve inside the large canister. The power sleeves and large armored sleeve are grounded to a metal plate in the large canister. The large and/or small canister has an external grounding port to connect to ground. The trunk cable could be grounded by its armored shield to the metal plate of the large canister, as well.

The fiber subunit(s) from the large armored furcation tube are routed inside the transition sleeve to the small canister and then distributed to smaller armored furcation tubes exiting the smaller canister. Each breakout from the smaller canister can take two, four or six optical fibers. Each small armored furcation tube can be terminated to a fiber optic connector presenting two, four or six fibers. Of course, other numbers of optical fibers can be accommodated in each breakout, such as eight, twelve, sixteen or twenty four, which could be terminated to an MPO-style fiber optic connector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limits of the present invention and wherein:

FIG. 3 is a perspective view with portions of the first canister removed to show the employment of the conductive frame within the first canister;

FIG. 3A is a close-up view of a portion of FIG. 3;

FIG. 4 is a perspective view showing a grounding lug on an exterior of the first canister;

FIG. 5 is a partial cutaway view of the structure of FIG. 4;

FIG. 6 is a perspective view with portions of the first canister removed to show an alternative form of attachment between the conductive frame and a portion of the shell of the first canister;

FIG. 6A is a close-up view of a portion of FIG. 6;

FIG. 8A is a close-up view of a portion of FIG. 8;

FIG. 10 is a perspective view of a second cable;

FIG. 11 is a close-up perspective view of a second shielding layer within the second cable of FIG. 10;

FIG. 12 is a perspective view of a third cable;

FIG. 18 is a side view of a conductive frame, in accordance with a fourth embodiment; and FIG. 19 is a perspective view of a braided cable used in the conductive frame of FIG. 18.

DETAILED DESCRIPTION OF EMBODIMENTS OF THE INVENTION

Figure 1:
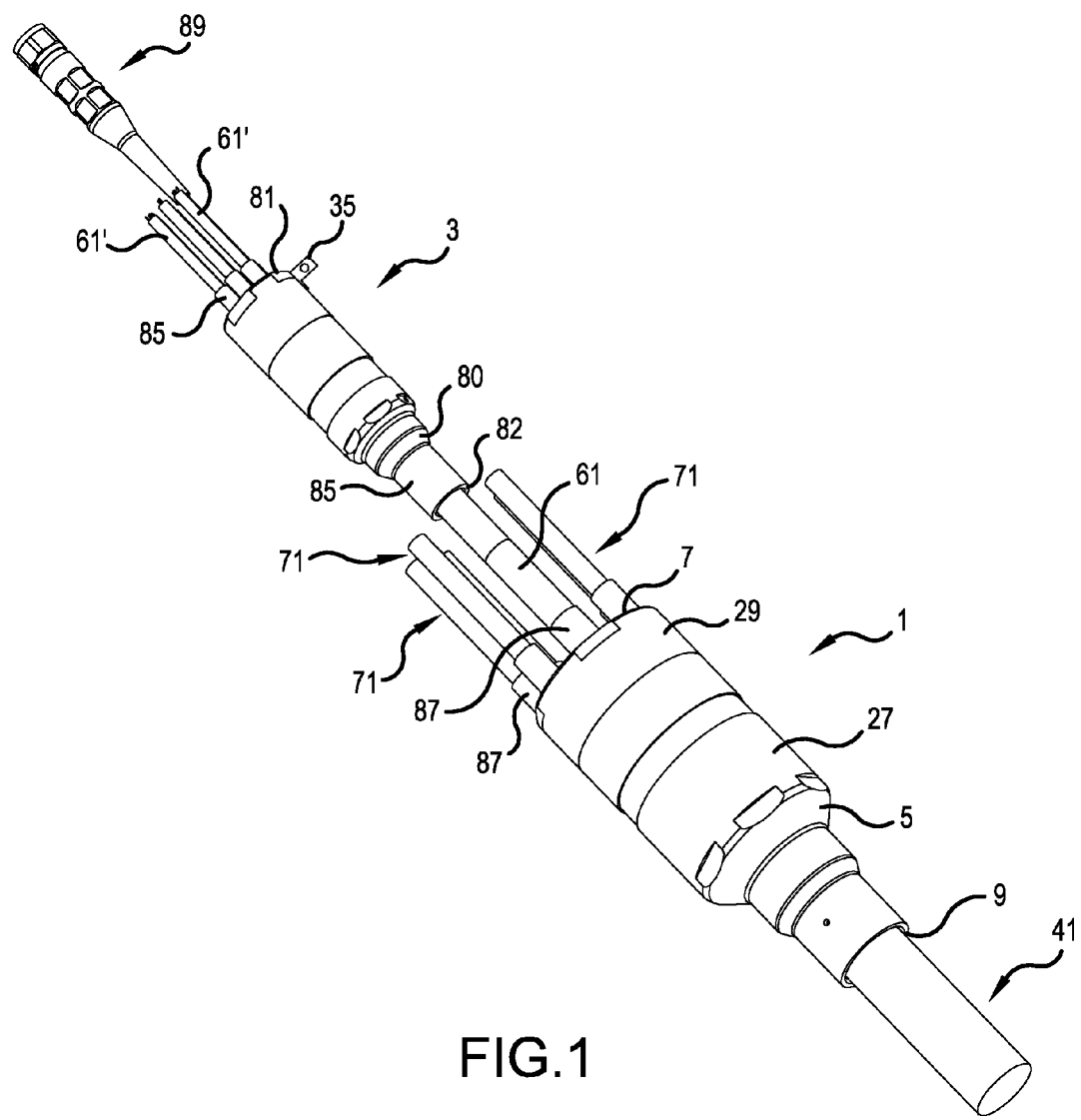
FIG. 1 is a perspective view of first and second canisters of a breakout system, in accordance with the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 shows a first enclosure 1, resembling a large canister and a second enclosure 3, resembling a small canister. The first enclosure 1 includes a first side 5 and a second side 7, opposite to the first side 5. A first opening 9 is on the first side 5. A plurality of second openings 11 are on the second side 7.

Figure 2:
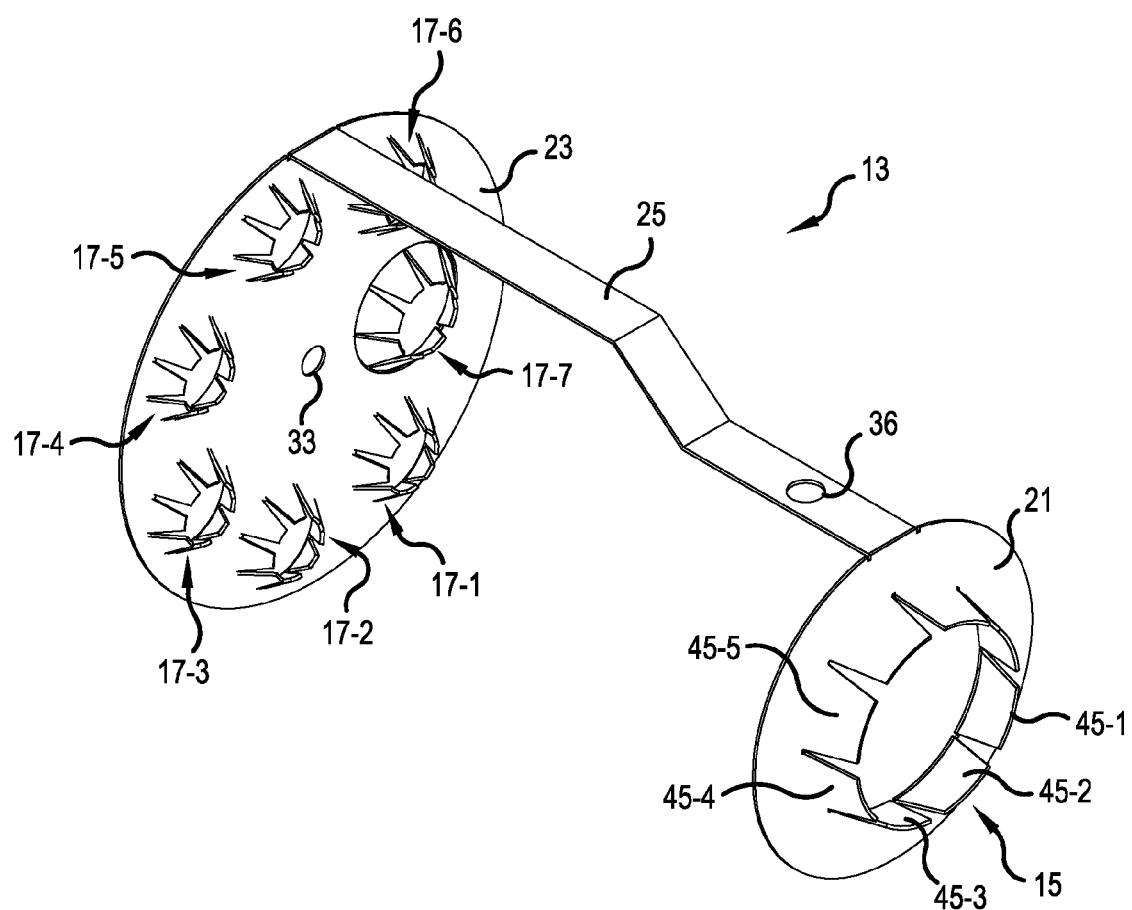
FIG. 2 is a perspective view of a conductive frame within the first canister.
Figure 7:
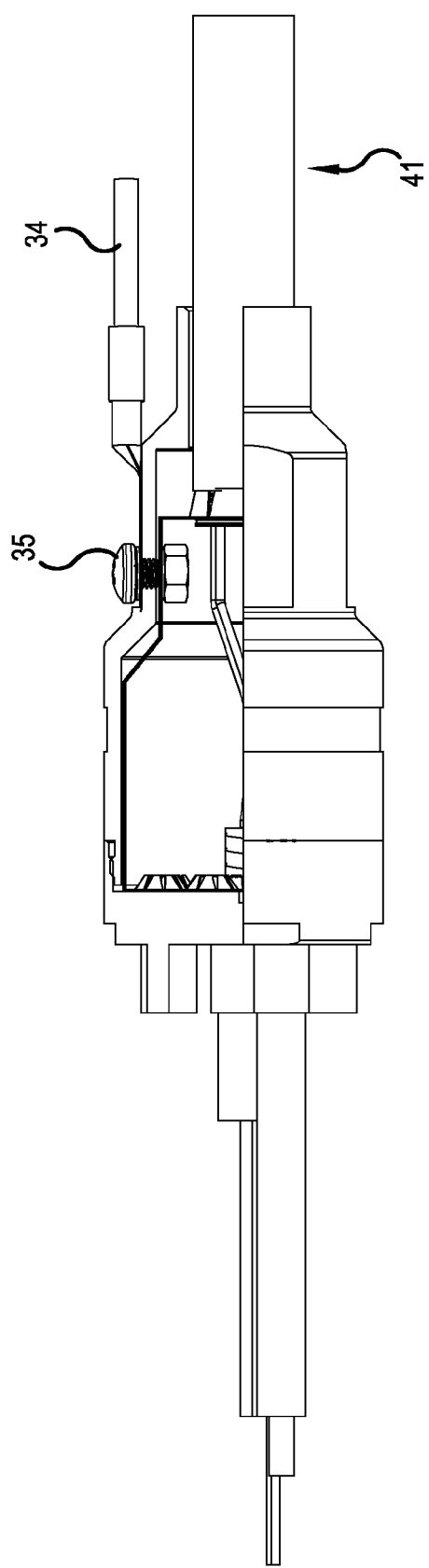
FIG. 7 is a partial cutaway view showing the electrical attachment of the grounding lug of FIG. 4 to the conductive frame.

As best seen in FIGS. 2 and 3, a conductive frame 13 is disposed within the first enclosure 1. The conductive frame 13 includes a first spring basket 15 aligned to the first opening 9 on the first side 5 of the first enclosure 1. The conductive frame 13 also includes a plurality of second spring baskets 17, e.g., 17-1, 17-2, 17-3, 17-4, 17-5, 17-6 and 17-7, aligned to the plurality of second openings 11 in the second side 7 of the first enclosure 1.

Figure 13:
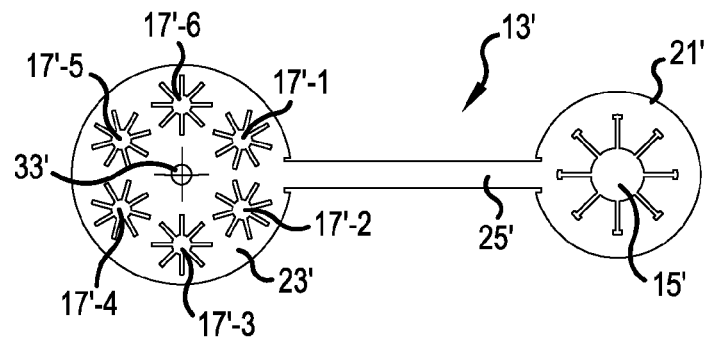
FIG. 13 is a top plan view of a stamped conductive frame for a smaller canister, in accordance with a second embodiment.

The conductive frame 13 may be formed of a sheet of metal, which is stamped or cut when flat (see FIG. 13), then bent to form the spring baskets 15 and 17. In the embodiment of FIG. 2, the sheet of metal has a first substantially circular portion 21 including the first spring basket 15, and a second substantially circular portion 23 including the plurality of second spring baskets 17-1 through 17-7. A thinner connecting link 25 connects the first substantially circular portion 21 to the second substantially circular portion 23.

As best seen in FIG. 2, the first substantially circular portion 21 is bent to reside at an angle of approximately ninety degrees relative to the connecting link 25, and the second substantially circular portion 23 is bent to reside at an angle of approximately ninety degrees relative to the connecting link 25.

The first enclosure 1 may be formed of a first shell 27 mated to a second shell 29. The first and second shells 27 and 29 may be formed of plastic, metal or other suitable materials. Optionally, a seal 31, such as an O-ring, may reside between the first shell 27 and the second shell 29. The first shell 27 includes the first side 5. The second shell 29 includes the second side 7. The second shell 29 of the first enclosure 1 may be attached to the conductive frame 13 via a threaded fastener, such as a screw 12 (FIGS. 3/3A) or bolt 14 (FIGS. 6/6A), passed through an opening 33 proximate the center of the second substantially circular portion 23.

A conductive tap 35 (FIG. 5), such as a lug or screw, may optionally be provided on an exterior of the first enclosure 1, and/or the second enclosure 3, for receiving a grounding wire 34. The conductive tap 35 is electrically connected to the conductive frame 13 within the first or second enclosure 1 or 3, e.g., by threaded engagement to a through hole 36 in the connecting link 25.

Figure 8:
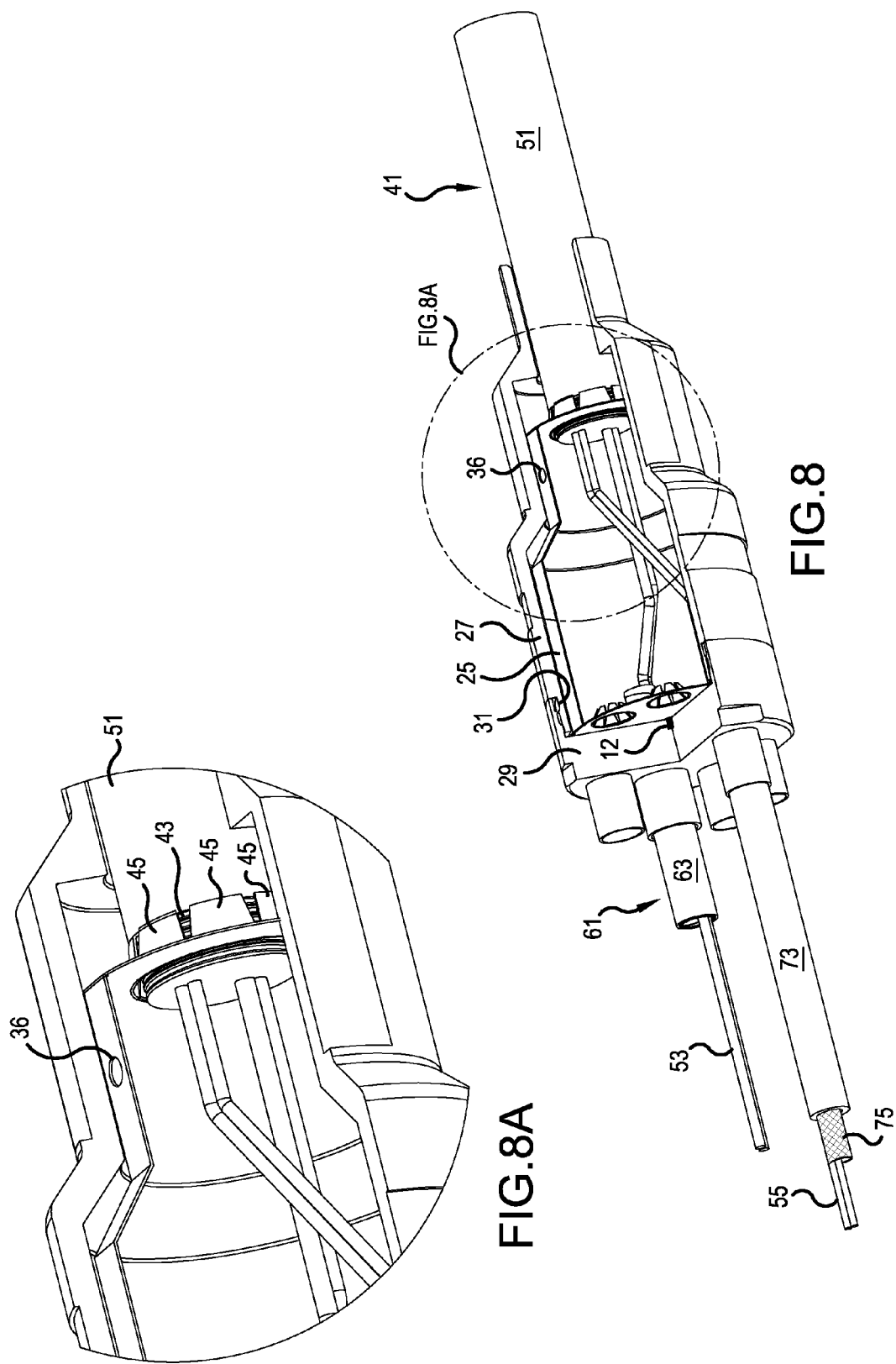
FIG. 8 is a perspective view with portions of the first canister removed to show details of the engagement of a first spring basket to the a first shielding layer.
Figure 15:
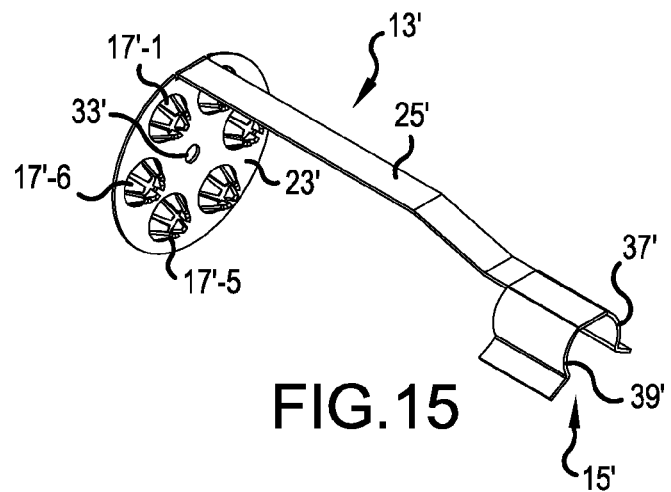
FIG. 15 is a perspective view of a conductive frame, in accordance with a third embodiment.

In the embodiment of the conductive frame 13' depicted in FIG. 15, the first substantially circular portion 21 has been replaced by a snap-in clip design. The first spring basket 15' includes a first tab 37' facing to a second tab 39'. The first and second tabs 37' and 39' may be pushed apart by a first shielding layer 43 of a first cable 41 inserted there between, as will be described in further detail herein. A resilience of the first and second tabs 37' and 39' tends to move the first and second tabs 37' and 39' into electrically conductive engagement with the first shielding layer 43 (FIG. 8A) of the first cable 41.

In the embodiment of the conductive frame 13 depicted in FIG. 2, the first substantially circular portion 21 includes a first spring basket 15 including a plurality of tabs 45, such as tabs 45-1, 45-2, 45-3, 45-4, 45-5, etc., spaced from each other around an opening cut into the conductive frame 13 in a star-burst pattern. The plurality of tabs 45 may be pushed apart by the shielding layer 43 of the first cable 41 inserted into a center of the star-burst pattern. A resilience of the plurality of tabs 45 tends to move the plurality of tabs 45 into electrically conductive engagement with the first shielding layer 43.

Figure 9:
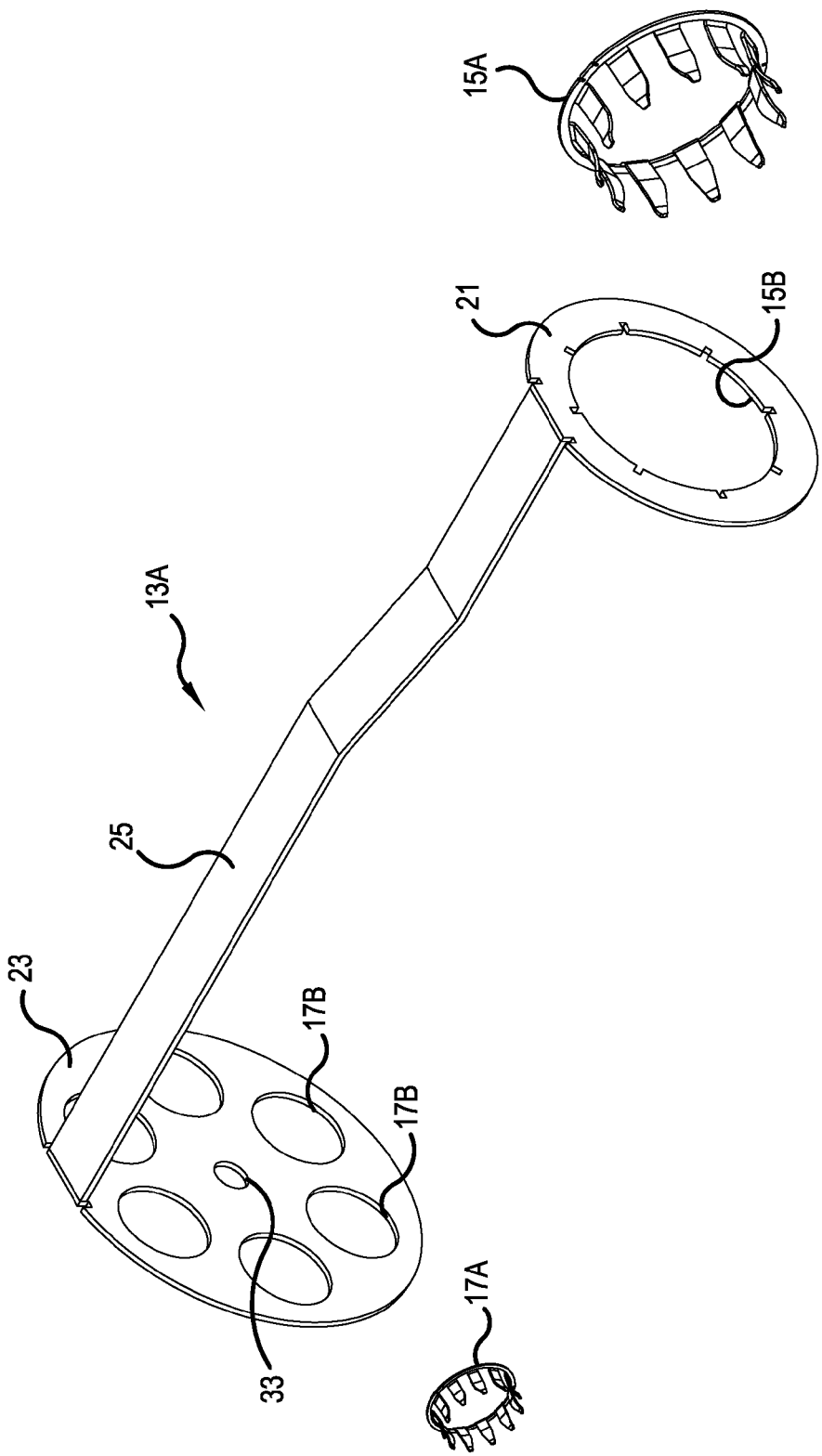
FIG. 9 is a perspective view of a conductive frame, in accordance with a second embodiment.

FIG. 9 shows an alternative embodiment of the conductive frame 13A wherein the spring baskets 15A and 17A are separately formed from the conductive frame 13A. The spring baskets 15A and 17A may be attached to circular holes 15B and 17B formed in the substantially circular plates 21 and 23.

The first cable 41 includes first jacket 51 surrounding the first shielding layer 43 which in turn surrounds a plurality of optical fibers 53 and conductors 55. The plurality of optical fibers 53 may be divided into one or more subunits, each surrounded by a protective tube. The first jacket 51 is removed from an end of the first cable 41, inserted into the first opening 9 of the first enclosure 1. The first shielding layer 43 is brought into electrical contact with the first spring basket 15, as noted above.

As best seen in FIG. 11, a second cable 61 includes a second jacket 63 surrounding a plurality of strength members 64, e.g., aramid yard, like KEVLAR, which in turn surround a second shielding layer 65. The second jacket 63 is removed from a first end of the second cable 61. The second cable 61 is inserted into one opening 11-7 of the plurality of second openings 11 of the first enclosure 1. The second shielding layer 65 is brought into electrical contact with one of the second spring baskets 17, e.g., second spring basket 17-7, of the plurality of second spring baskets 17.

As best seen in FIG. 10 the first shielding layer 65 may be supported from within by an inner sleeve 66. The inner sleeve 66 assists in holding the second shielding layer 65 in engagement with the spring basket 17 if the second shielding layer 65 is a loose braid and/or foil. However, if the second shielding layer 65 is rigid armor, the inner sleeve 66 is optional. The inner sleeve 66 surrounds a second set of strength members 67, e.g., aramid fibers, which in turn surround one or more buffer tubes or fiber subunits 69.

The optical fibers 53 or fiber subunits 69 exiting the first cable 41 are routed to the second cable 61 inside of the inner sleeve 66. A pull string may optionally be installed in the second cable 61 to facilitate the routing of the fiber subunits 69. It is noted that opening 11-7 and spring basket 17-7 may be larger than the other openings 11 and spring baskets 17, as best seen in FIG. 2.

As best seen in FIG. 12, a third cable 71 includes a third jacket 73 surrounding a third shielding layer 75 surrounding an inner sleeve 74. The third jacket 73 is removed from a first end of the third cable 71. The third cable 71 is inserted into another opening, e.g., 11-3, of the plurality of second openings 11 of the first enclosure 1. The third shielding layer 75 is brought into electrical contact with another one of the second spring baskets 17, e.g., second spring basket 17-3 of the plurality of second spring baskets 17. The inner sleeve 74 assists in holding the third shielding layer 75 in engagement with the spring basket 17 if the third shielding layer 75 is a loose braid and/or foil. However, if the third shielding layer 75 is rigid armor, the inner sleeve 74 is optional.

One or more of the conductors 55 exiting the first cable 41 are then routed down the third cable 71 inside of the third shielding layer 75. A pull string may optionally be installed in the third cable 71 to facilitate the routing. The conductors 55 may be insulated conductors used for powering a remote radio unit (RRU), and may be of a large gauge such as 12, 10, 8 or 6 AWG.

Figure 14:
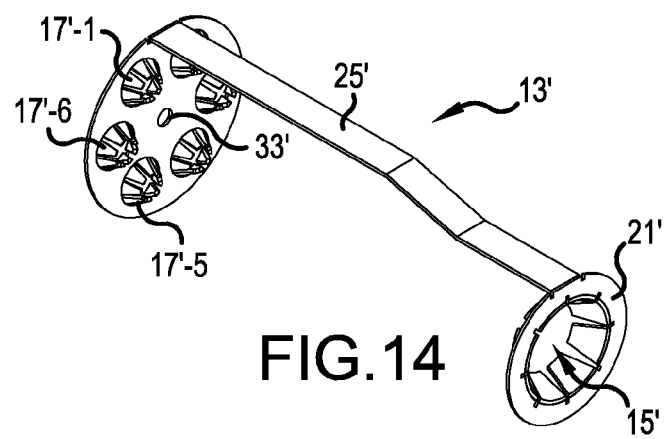
FIG. 14 is a perspective view of the conductive frame of FIG. 13 after a bending operation.

As seen in FIG. 1, the break-out assembly may further include a second break-out canister including the second enclosure 3. The second enclosure 3 has a third side 80 and a fourth side 81, opposite the third side 80. A third opening 82 is formed in the third side 80. A plurality of fourth openings 83 (See FIG. 18) are formed in the fourth side 81. A second conductive frame 13' (FIGS. 13-15) is disposed within the second enclosure 3.

The second conductive frame 13' is formed very similarly to the first conductive frame 13, however it is generally smaller and may include fewer exiting spring baskets. The second conductive frame 13' includes a third spring basket 15' aligned to the third opening 82 on the third side 80 of the second enclosure 3. A plurality of fourth spring baskets 17', such as fourth spring baskets, 17'1, 17'-2, 17'-3, 17'-4, 17'-5 and 17'-6 are aligned to the plurality of fourth openings 83 in the fourth side 81 of the second enclosure 3.

The second jacket 63 of the second cable 61 is removed from a second end of the second cable 61. The second cable 61 is inserted into the third opening 82 of the second enclosure 3 and the second shielding layer 65 is placed into electrical contact with the third spring basket 15' of the second conductive frame 13'.

A fourth cable 61' is formed the same as the second cable 61, although on a smaller scale. Like parts of the fourth cable 61' are denoted with a prime symbol ('). The fourth cable 61' includes a fourth jacket 63' surrounding strength members 64' and a fourth shielding layer 65', which in turn surrounds a buffer tube 69'. Strength members 67' and an inner sleeve 66' may surround the buffer tube 69' and reside within the fourth shielding layer 65'. The fourth jacket 63' is removed from a first end of the fourth cable 61', and the fourth cable 61' is inserted into one opening 83 of the plurality of fourth openings 83 of the second enclosure 3. The fourth shielding layer 65' is brought into electrical contact with one of the plurality of fourth spring baskets 17'.

A second end of the fourth cable 81 is terminated to a fiber optic connector 89. The strength members 64' and/or 67' may be attached to the fiber optic connector 89 in a conventional manner to secure the fourth cable 61' to the fiber optical connector 89 and provide strain relief. The strength members 64', 67' and 64, 67 may also be connected by epoxy to strain relief features, e.g., strain relief boots 85 of the second enclosure 3 and boots 87 of the first enclosure 1. In a preferred embodiment, the first or trunk cable 41 and the second, third and fourth or break-out cables 61, 71 and 61' are armored, having a strong shielding layer formed by interlocking rigid metal materials, which allow the cables to resist damage caused by birds and rodents.

FIG. 18 shows an alternative conductive frame 90, which may be substituted for the conductive frames 13 and/or 13'. The conductive frame 90 is formed from a flat braided strap 91, as illustrated in FIG. 19. A first end of the conductive frame 90 may include a terminal 92 with a through hole 93 for receiving the lug 35 (See FIG. 1), such as a screw, as shown in FIGS. 4 and 5.

Figure 16:
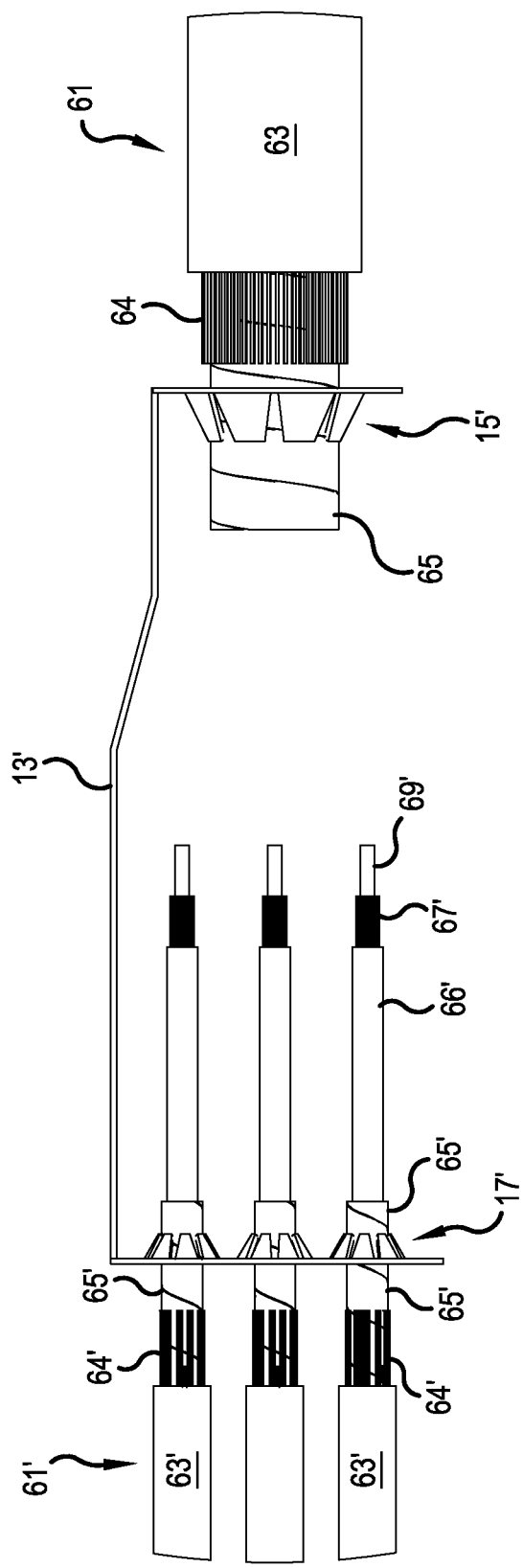
FIG. 16 is a side view of the conductive frame of FIG. 14 with cables installed thereto.
Figure 17:
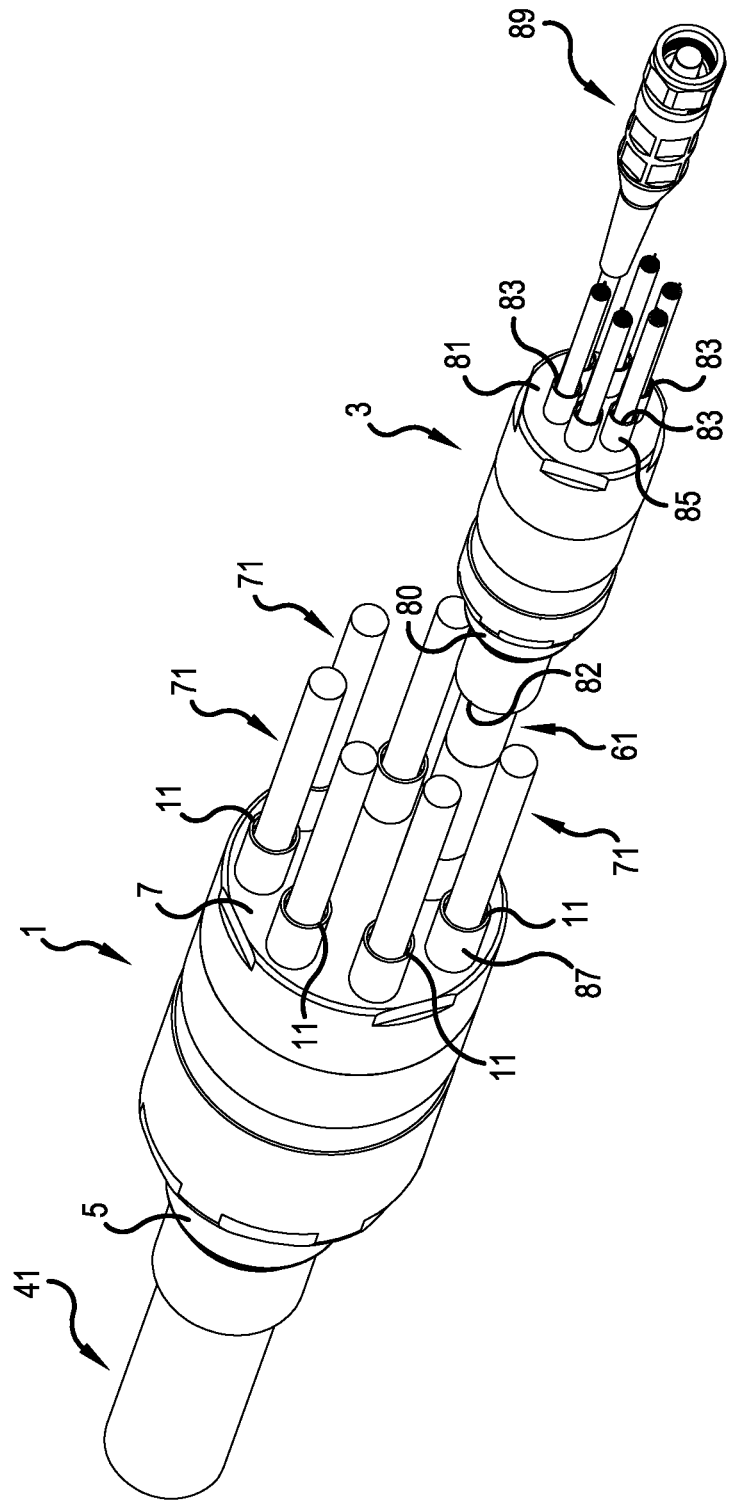
FIG. 17 is a perspective view of a first canister breakout for conductors and optical fibers leading to a second canister breakout for optical fibers.

Proximate the first end of the conductive strap 90 is a portion 94, which acts a spring basket and wraps around and establishes electrical conductivity with the second shielding layer 65 of the second cable 61. Proximate the second end of the conductive strap 90 are a portions 95A, 95B, 95C, . . . , which function as spring baskets and wrap around and establish electrical conductivity with the fourth shielding layers 65' of the fourth cables 61'. Other than the flexible nature of the conductive frame 90 and location of the terminal 92 and through hole 93 and the alternatively structured spring baskets 94 and 95, the configuration is the same as depicted in FIG. 16.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A break-out assembly comprising:
an enclosure including side walls, a first side end wall and a second side end wall opposite said first side end wall, the side walls, first end wall and second end wall defining a cavity;
a first opening on in said first side end wall;
a plurality of second openings on in said second side end wall; and
a conductive frame disposed within said enclosure cavity, said conductive frame including a first spring basket comprising a plurality of first tabs around a first aperture, the first spring basket aligned to with said first opening on in said first side end wall of said enclosure and a plurality of second spring baskets, each of the second spring baskets having a second aperture, each of the second spring baskets comprising a plurality of second tabs around the second aperture, each of the second spring baskets aligned to with a respective one of said plurality of second openings in said second side end wall of said enclosure.

2. The break-out assembly of claim 1, wherein said conductive frame is formed of a sheet of metal which is stamped or cut, then bent to form said spring baskets.

3. The break-out assembly of claim 2, wherein said sheet of metal has a first substantially circular portion including said first spring basket, and a second substantially circular portion including said plurality of second spring baskets, and a connecting link connecting said first substantially circular portion to said second substantially circular portion, and wherein said first substantially circular portion is bent to reside at an angle of approximately ninety degrees relative to said connecting link, and said second substantially circular portion is bent to reside at an angle of approximately ninety degrees relative to said connecting link.

4. The break-out assembly of claim 1, wherein said enclosure is formed of a first shell mated to a second shell, and further comprising a seal between said first shell and said second shell.

5. The break-out assembly of claim 4, wherein said seal is an O-ring.

6. The break-out assembly of claim 4, wherein said first shell includes said first side end wall, said second shell includes said second side end wall, and said second shell of said enclosure is attached to said conductive frame via a threaded fastener.

7. The break-out assembly of claim 1, further comprising:
a lug on an exterior of said enclosure for receiving a grounding wire, wherein said lug is electrically connected to said conductive frame within said enclosure.

8. The break-out assembly of claim 1, wherein said first spring basket includes a first tab facing to a second tab, and wherein two of said first and second tabs may be pushed apart by a shielding layer of a cable inserted therebetween, and wherein a resilience of said two first and second tabs tends to move said two first and second tabs into electrically conductive engagement with the shielding layer.

9. The break-out assembly of claim 1, wherein said conductive frame is formed by a braided strap.

10. The break-out assembly of claim 9, wherein said spring baskets are portions of said braided strap which wrap around and establish an electrically conductive engagement with a shielding layer of a cable.

11. The break-out assembly of claim 9, wherein said braided strap includes a terminal at one end.

12. The break-out assembly of claim 11, wherein said terminal is electrically connected to a lug on an exterior of said enclosure for receiving a grounding wire.

13. A break-out assembly comprising:
a first break-out canister including:
a first enclosure including side walls, a first side end wall and a second side end wall opposite said first side end wall, the side walls, first end wall and second end wall defining a cavity;
a first opening on in said first side end wall;
a plurality of second openings on in said second side end wall; and
a first conductive frame disposed within said first enclosure cavity; said first conductive frame including a first spring basket comprising a plurality of first tabs around a first aperture, the first spring basket aligned to with said first opening on said first side end wall of said first enclosure and a plurality of second spring baskets, each of the second spring baskets having a second aperture, each of the second spring baskets comprising a plurality of second tabs around the second aperture, each of the second spring baskets aligned to with a respective one of said plurality of second openings in said second side end wall of said first enclosure; and
a first cable including a first jacket surrounding a first shielding layer which in turn surrounds a plurality of optical fibers and conductors, wherein said first jacket is removed from an end of said first cable, and wherein said first cable is inserted into said first opening of said first end wall of said first enclosure and said first shielding layer is in electrical contact with said first spring basket.

14. The break-out assembly of claim 13, further comprising:
a second cable including a second jacket surrounding a second shielding layer, wherein said second jacket is removed from a first end of said second cable, and wherein said second cable is inserted into one opening of said plurality of second openings of said first enclosure and said second shielding layer is in electrical contact with one of said plurality of second spring baskets, and wherein said plurality of optical fibers pass from said first enclosure into said second cable.

15. The break-out assembly of claim 14, further comprising:
a third cable including a third jacket surrounding a third shielding layer, wherein said third jacket is removed from a first end of said third cable, and wherein said third cable is inserted into another opening of said plurality of second openings of said first enclosure and said third shielding layer is in electrical contact with another one of said plurality of second spring baskets, and at least one of said conductors passed from said first enclosure into said third cable.

* * * * *